UNITED STATES PATENT OFFICE.

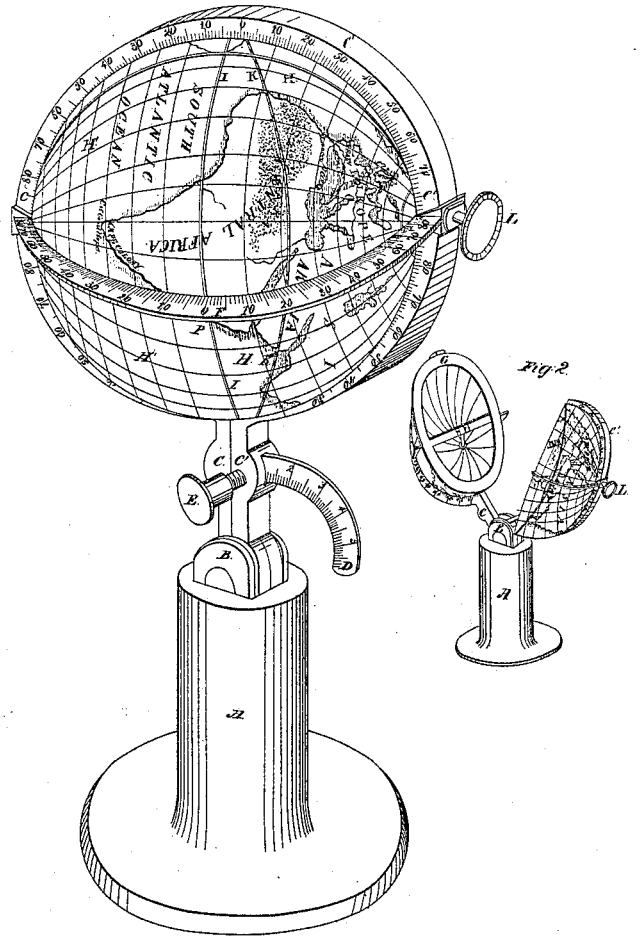

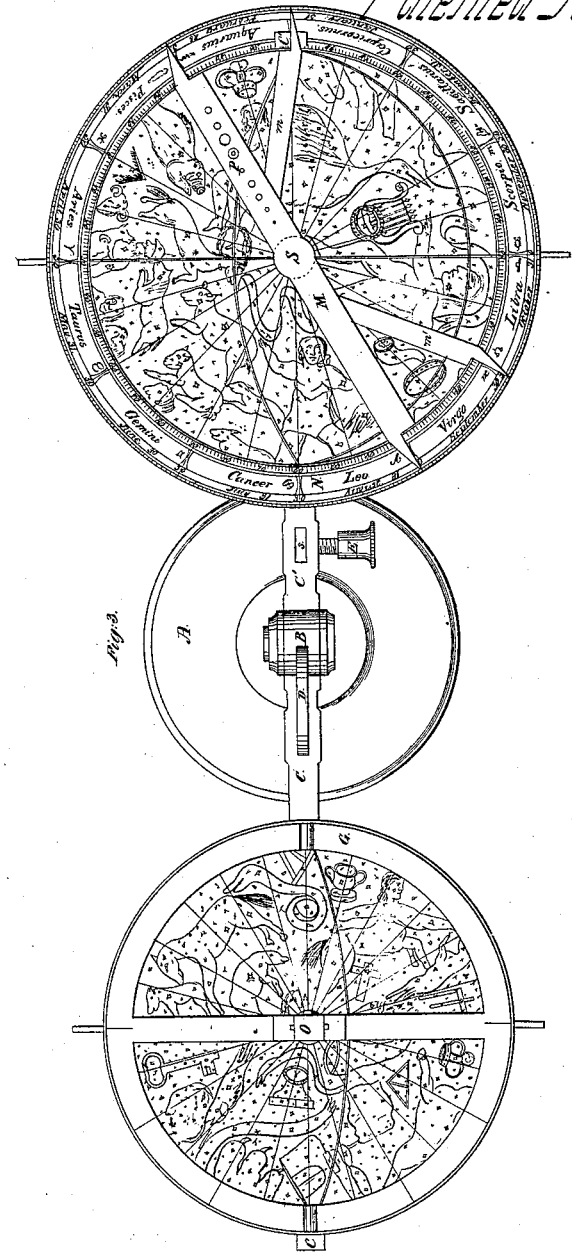

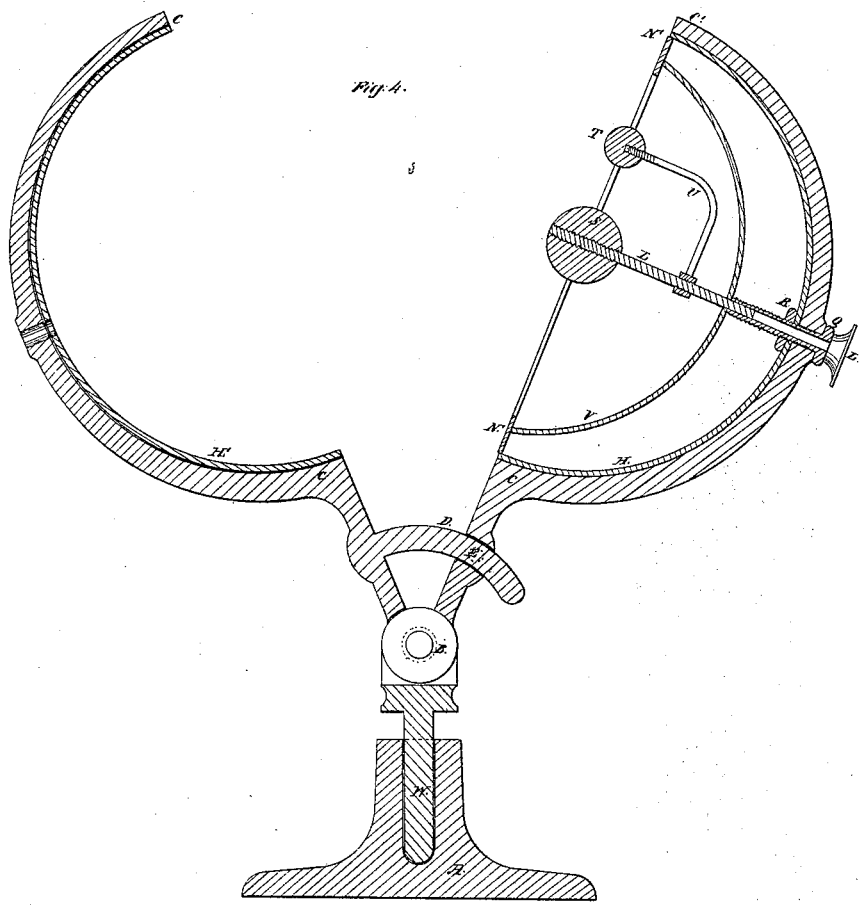

JOHN R. AGNEW, OF PHILADELPHIA, PENNSYLVANIA.

SCHOOL-GLOBE.

Specification of Letters Patent No. 29,229, dated July 24, 1860.

*To all whom it may concern:*

Be it known that I, JOHN ROBINSON AGNEW, of Philadelphia, in the State of Pennsylvania, have invented certain new and useful Improvements in Apparatus for Illustrating Astronomy, which I denominate a "Terræ Cœlian Globe;" and I do hereby declare the following to be a correct description of the same, reference being had to the accompanying drawing, in which—

Figure 1 is a perspective view of the globe when closed; Fig. 2 is a similar view of the globe when open so that its interior surfaces can be inspected; Fig. 3 is a plan or top view of the globe open to an angle of 180°, and having some additional apparatus attached; Fig. 4 is a vertical section of the globe, calipers and stand.

The same part is marked by the same letter wherever it occurs.

The nature of my invention consists in the peculiar construction and arrangement of apparatus hereinafter particularly described, whereby a single globe is made to serve the purposes commonly accomplished by two globes (one terrestrial and the other celestial) and at the same time to afford opportunities for the introduction of apparatus for illustrating the subject of astronomy by a nearer approach to an imitation of the actual motions of the heavenly bodies than is attained by any apparatus now known and used.

To enable others to make and use my improved globe, I will proceed to describe its construction and operation, referring to the drawings by the letters of reference marked thereon.

A is the pedestal which I make sufficiently heavy to afford a substantial support to the globe and its attachments in all positions. This pedestal may have a cylindrical socket in it, as shown at W in Fig. 4, in which a pivot of corresponding form may be received, on which the globe is to turn horizontally when desired; or the pedestal may have a square socket which will not permit the rotation of the globe, as shown in Fig. 1.

The globe, which consists of two distinct hemispheres, is supported in a pair of calipers C, C', which have a hinge at B. The arms of these calipers, when brought together, form the prime meridian circle, as shown in Fig. 1. They open on hinge B and their motion is steadied by arc D, which is attached to arm C, and passes through a slot *s* in arm C', to which it is clamped by set screw E, which regulates the distance to which the calipers are opened. When desired, they may, as in Fig. 3, be thrown open at an angle of 180°, but in ordinary use, they will be about in the position represented in Figs. 2 and 4. At right angles to the prime meridian C C' is the terrestrial rational horizon circle F.

The globe is divided into two hemispheres H, H' at the line of the equator I, one hemisphere being attached to each caliper arm and moving with it. The prime meridian circle opens at the zero points, at top and bottom, and the horizon circle F also opens at the zero points on the sides, so that the globe may readily be thrown open and display its interior concave surfaces as shown in Figs. 2 and 3.

On the interior surface of the globe I place representations of the northern and southern celestial hemispheres, showing the stars and constellations in their proper positions, and, from the concavity of the surface alone, a much more correct notion of the true relations of the heavenly bodies is given to the young learner than can be imparted by the ordinary convex celestial globe.

On the exterior surface of the hemispheres, I place the usual representation of the earth's surface with the great circles, meridians, parallels, &c.

In Figs. 2 and 3, G marks the celestial movable horizon which is attached to a universal joint at O, which joint is supported on the end of the semiaxial screw L, so that the horizon can be elevated or depressed or rotated in either direction within and around the hemisphere to which it is attached. On one side of this circle may be represented the position of the earth, or of any one of the planets, in each month of the year, and on the other the signs of the zodiac.

L marks a metallic rod or wire passing from the exterior of the globe, at either pole through a screw cylinder Q which is held by nut R on the inside of the globe as shown in Fig. 4. This rod passes in a distance equal to half the axis of the globe, and has a thread cut on its inner end for the reception of various articles of apparatus which are made to be attached to it; and, on its outer end, a thumb-screw by which it can be rotated. That portion of it which passes through the cylinder screw Q is smooth, so that the rod can freely turn in it while it still fits snugly. To this rod L I attach various articles of apparatus according to the branch of the subject which I wish to illustrate.

Around the periphery of one of the hemispheres I attach the fixed zodiacal circle N, Fig. 3, on which are marked the months, days and signs as shown. This circle can be replaced, when desired, by the circle G on which the signs, &c., may be represented; or by the moving zodiacal circle N'.

One of the articles which I attach to the end of the semiaxial rod L is the zodiacal index M, having two pointers at each end, and the sun S, represented at its center, and any or all of the planets indicated thereon, as at P, between the sun and the pointers. By this index can be shown at the same time the places of the sun, and any of the planets, both in the signs and constellations. On the same screw may be attached the movable horizon G by the universal joint O, so that the horizon can be rotated within the globe at any angle to the equator. I can also place on screw L, as in Fig. 4, a model of the sun S, and by arms like that marked U, I can attach models of one or any number of the planets, as T, forming a more or less complete orrery within the concave, and can thus illustrate the relative positions of the sun and planets to the celestial hemispheres on any day or month of the year. By curved arm V, Fig. 4, I also attach to screw L the movable zodiacal circle N' which enables me to illustrate the apparent as the fixed zodiac does the real relative motions of the planets and constellations.

Either of the concave hemispheres forming my improved globe, may be rotated on its axis by being clamped to the cylindrical screw Q and providing said screw with a head by which it can be turned. By turning the hemisphere while the horizon remains stationary we obtain a complete illustration of the apparent diurnal motion of the heavens.

Having thus fully described my invention, what I claim and desire to secure by Letters Patent, is—

1. The combination of the calipers C, C', with the horizon F, hemispheres H, H', and as set forth.

2. In combination with a concave hemisphere, the movable horizon G, turning upon a universal joint at its center said joint being supported upon the inner end of the semiaxial rod L passing through the cylindrical screw Q, as and for the purpose described.

3. The double pointed zodiacal index M constructed and operating as described.

4. Finally I claim placing and operating an orrery, more or less complete, within a concave hemisphere or globe representing the celestial universe, substantially in the manner hereinbefore set forth.

The above specification, signed and witnessed this sixth day of June, A. D. 1860.

JOHN ROBINSON AGNEW.

Witnesses:
   CHAS. F. STANSBURY,
   EDM. F. BROWN.